United States Patent [19]
Kuwahara

[11] Patent Number: 6,070,079
[45] Date of Patent: May 30, 2000

[54] POSITIONING APPARATUS USED IN A CELLULAR COMMUNICATION SYSTEM AND CAPABLE OF CARRYING OUT A POSITIONING WITH A HIGH ACCURACY IN URBAN AREA

[75] Inventor: Yoshihiko Kuwahara, Tokyo, Japan

[73] Assignee: NEC Corporation, Japan

[21] Appl. No.: 09/234,577

[22] Filed: Jan. 21, 1999

[30] Foreign Application Priority Data

Jan. 21, 1998 [JP] Japan .................................. 10-009908

[51] Int. Cl.[7] .............................. H04Q 7/20; H04Q 7/36; H04B 7/02
[52] U.S. Cl. ......................... 455/456; 455/457; 455/561; 455/562; 340/988; 340/991; 340/993; 342/58; 342/109; 342/450; 342/451; 342/457
[58] Field of Search ..................................... 455/456, 457, 455/561, 417, 562, 132; 342/357.01, 450, 457, 58, 109, 113, 115, 451, 454, 461; 340/988, 991, 993

[56] References Cited

U.S. PATENT DOCUMENTS

| | | | |
|---|---|---|---|
| 5,819,199 | 10/1998 | Kawai et al. | 342/357 |
| 5,832,389 | 11/1998 | Dent | 455/562 |
| 5,873,048 | 2/1999 | Yun | 455/562 |
| 5,883,598 | 3/1999 | Parl et al. | 342/457 |
| 5,890,067 | 3/1999 | Chang et al. | 455/562 |
| 5,911,774 | 6/1999 | Itoh | 340/988 |
| 5,918,154 | 6/1999 | Beasley | 455/562 |
| 5,926,768 | 7/1999 | Lewiner et al. | 455/562 |
| 5,929,752 | 7/1999 | Janky et al. | 340/988 |
| 5,930,243 | 7/1999 | Parish et al. | 455/562 |
| 5,930,717 | 7/1999 | Yost et al. | 455/456 |
| 5,933,114 | 8/1999 | Eizenhofer et al. | 455/456 |

OTHER PUBLICATIONS

Kikuchi, Hideo et al., *Technical Report of IEICE*, "Simultaneous Estimation of the Incident Direction and Propagation Delay Time of a Multiple Wave Using 2D–Unitary ESPRIT," vol. 97–98, Jul. 1997, pp. 53–60.

*Primary Examiner*—Wellington Chin
*Assistant Examiner*—Simon Nguyen
*Attorney, Agent, or Firm*—Ostrolenk, Faber, Gerb & Soffen, LLP

[57] ABSTRACT

A positioning apparatus is provided in a cellular base station for positioning a portable terminal in a cell covered by the cellular base station. The positioning apparatus has a base position indicative of a position of the cellular base station on a map. The positioning apparatus comprises an array antenna for receiving a transmission signal transmitted by the portable terminal to output a plurality of reception signals. A receiver section translates the reception signals into a plurality of baseband signals to demodulate the baseband signals into a plurality of demodulated signals. An estimation section estimates incident direction and delay time of the transmission signal on the basis of the demodulated signals to output an estimation result indicative of the incident direction and the delay time. A position calculating means calculates a terminal position of the portable terminal on the map in accordance with the estimation result and the base position to output a terminal position signal indicative of the terminal position.

8 Claims, 8 Drawing Sheets

POSITIONING APPARATUS USED IN A CELLULAR COMMUNICATION SYSTEM AND CAPABLE OF CARRYING OUT A POSITIONING WITH A HIGH ACCURACY IN URBAN AREA

BACKGROUND OF THE INVENTION

This invention relates to a positioning apparatus (hereinafter a positioner) and more particularly to a positioner in a cellular base station that determines a position (positions) a portable terminal in a service area (cell) covered by the cellular base station.

Various methods of connection are employed in mobile communication systems such as portable telephone systems. Specifically, the methods of access can be generally classified into three methods, i.e., FDMA (frequency division multiple access) method, TDMA (time division multiple access) method and CDMA (code division multiple access) method. It has already been determined to use the CDMA method among those three methods for connection for IMT (international mobile telecommunication) 2000 which is the next generation portable telephone system because it employs a spread spectrum technique and therefore exhibits higher efficiency of frequency utilization compared to the TDMA method.

While there are many types of spread spectrum techniques (e.g., the direct spread (DS) method and frequency hopping (FH) method), this invention is applied to DS type spread spectrum communication (CDMA).

In such a CDMA type portable telephone system, it is desirable to position portable terminals. Such a need arises in consumer services and emergency car guiding systems. Consumer services are required by the IMT 2000 as an alternative to GPS navigation. Emergency call services are under evaluation and experiment in the United States as emergency car guiding systems.

Two methods described below have been used as systems for positioning portable terminals. One is a positioning system utilizing the GPS (global positioning system) method. In this positioning system, each portable terminal is equipped with a GPS receiver to allow the portable terminal to position itself, and the result of positioning at each portable terminal is transmitted to a base station to allow the base station to manage the information on the positions of the portable terminals.

The other is a positioning system utilizing a direction finder. In this positioning system, a plurality of base stations are provided with an azimuth detecting function, and a portable terminal is positioned based on a point at which azimuth lines defined by azimuth detection signals output by the base stations. The result of positioning may be transmitted from each base station to a portable terminal to allow its portable terminal to identify the position of itself.

However, the above-described positioning system utilizing the GPS method has problems as described below. The first problem is that it is subject to limitations during use in an urban area. The reason is that positioning requires reception signals from 3 or 4 CPS satellites, and it is difficult to identify locations that are blocked by buildings, roadside trees and the like. The second problem is that positioning accuracy is low. The reason is that positioning signals from GPS satellites open to public use are intentionally manipulated to provide low positioning accuracy in favor of the national interest of the United States.

The above-described positioning system utilizing a direction finder has problems as described below. The first problem is that it can not be used in existing cell configurations for portable telephones. The reason is that the positioning based on the output of a plurality of direction finders requires sufficient overlaps between the cells which does not currently exist. The second problem is that it is subject to limitations during use in an urban area. The reason is that it is necessary to maintain line of sight from several base stations to a portable terminal which is often difficult in an urban area.

SUMMARY OF THE INVENTION

It is therefore an object of this invention to provide a positioning apparatus hardly affected in an urban area.

It is another object of this invention to provide a positioning apparatus capable of positioning portable terminals without changing cell configurations for portable telephones.

It is still another object of this invention to provide a positioning apparats capable of carrying out positioning with high accuracy.

On describing the gist of this invention, it is possible to understand that a positioning apparatus is provided in a cellular base station for positioning a portable terminal in a cell covered by the cellular base station. The positioning apparatus has a base portion indicative of a position of the cellular base station on a map.

According to this invention, the positioning apparatus comprises an array antenna for receiving a transmission signal transmitted by the portable terminal, receiver means for translating the reception signals into a plurality of baseband signals to demodulate the baseband signals into a plurality of demodulated signals, estimation means for estimating incident direction and delay time of the transmission signal on the basis of the demodulated signals to output an estimation result indicative of the incident direction and the delay time, and position calculating means for calculating a terminal position of the portable terminal on the map in accordance with the estimation result and the base position to output a terminal position signal indicative of the terminal position.

DESCRIPTION OF THE PREFERRED EMBODIMENT

Figure 1:
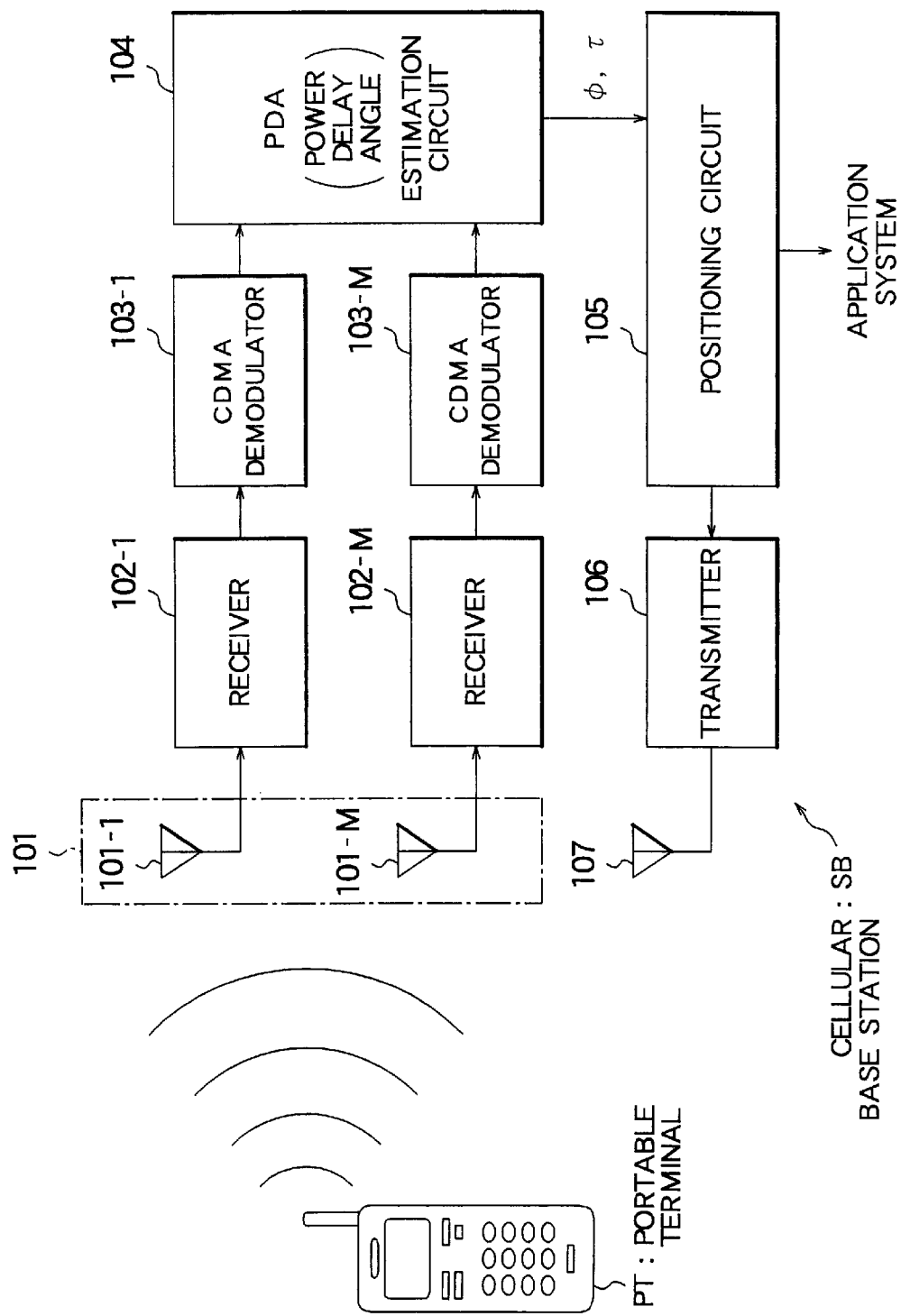
FIG. 1 is a block diagram of a cellular base station having a positioner according to a preferred embodiment of this invention along with a portable terminal.

Referring to FIG. 1, the illustrated cellular base station SB comprises an array antenna 101 having first through M-th antenna elements 101-1 through 101-M for receiving signals transmitted by the portable terminal PT, where M represents a positive integer which is not less than one. First through M-th receivers 102-1 through 102-M are for translating signals from the respective antenna elements of the array antenna 101 into baseband signals. First through M-th CDMA demodulators 103-1 through 103-M are for demodulating a transmission signal multiplexed using the CMDA (code division multiple access) method to output demodulated signals in a plurality of systems. A PDA (power delay angle) estimation circuit 104 is for estimating an incident direction, delay time, and relative power from the demodulated signals in a plurality of systems and is for outputting the result of estimation indicating the incident direction, delay time, and relative power. A positioning circuit 105 is for establishing the position of the portable terminal PT on the basis of the incident direction and delay time indicated by the result of estimation output by the PDA estimation circuit 104 and is for outputting the result of position of the portable terminal PT. A transmitter 106 is for transmitting the result of positioning to the portable terminal PT through a transmission antenna 107. The combination of the receivers and CDMA demodulators is referred to as receiving device. Among the above-described components, the transmitter 106 and transmission antenna 107 may be a transmitter and a transmission antenna shared by cellular base stations SB.

Reviewing FIG. 1, the portable terminal PT transmits a spread spectrum signal which has been subjected to second order modulation using a predetermined second order modulation code. The cellular base station SB receives a multiplexed spread spectrum signal transmitted by a plurality of portable terminals PT in a service area (cell) covered by the cellular base station SB. As is well-known in this technical field, in order to demodulate a spread spectrum signal, it is necessary to capture the spread spectrum signal in synchronism therewith and to demodulate the synchronously captured spread spectrum signal using a second order modulation code assigned to the portable terminal PT.

Figure 2A:
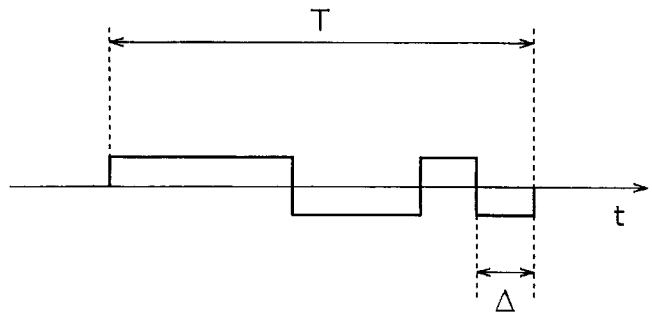
FIGS. 2A to 2C show a principal of generation of a synchronous signal using matched filters provided in receivers of the cellular base station illustrated in FIG. 1.
Figure 2B:
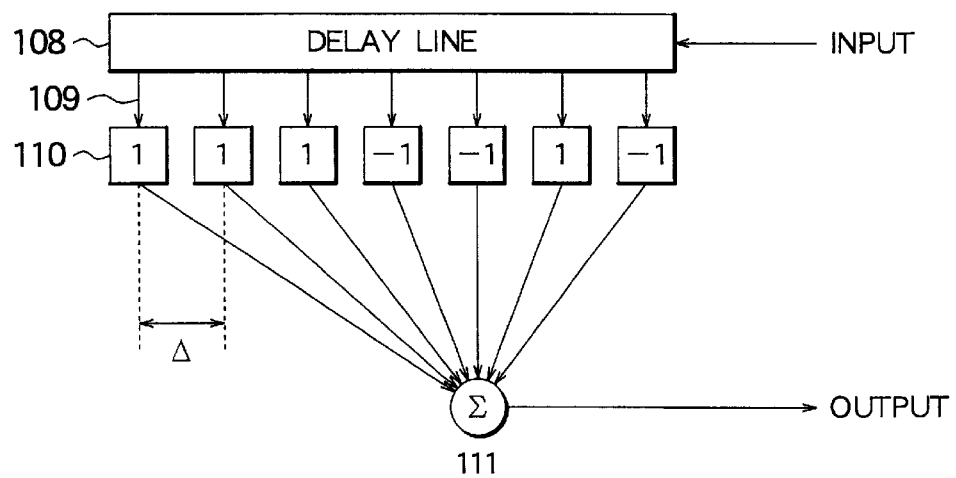
Figure 2C:
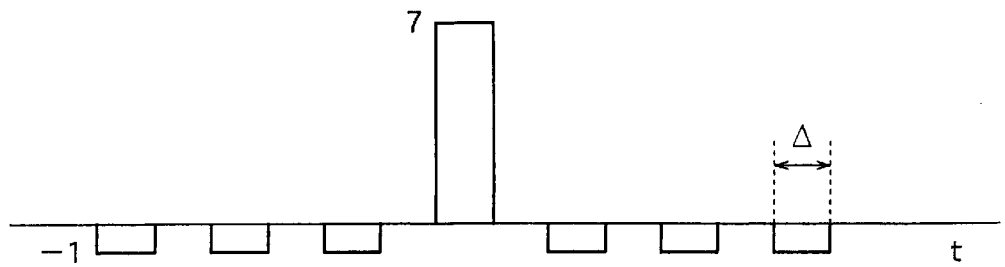

Referring to FIGS. 2A to 2C, description will be made as regards synchronous capture carried out with a matched filter provided at each receiving device. FIG. 2A indicates an input signal input to the matched filter. FIG. 2B indicates the configuration of the matched filter. FIG. 2C indicates an output signal output by the matched filter. As shown in FIG. 2B, the matched filter comprises a delay line 108, a plurality (seven in the illustrated example) of tape 109, a plurality (seven in the illustrated example) of weighting circuits 110, and an adder 111.

Time sequence signals with a period T having codes corresponding to coefficients set in the seven weighting circuits 110 (1, 1, 1, −1, −1, 1, −1 in the example in FIG. 2B) as shown FIG. 2A are input to the matched filter. In this case, as shown in FIG. 2C, auto-correlation is maximized to show a peak at timing when an input code agrees with a weighting code. Each of the CDMA demodulators 103-1 through 103-M demodulates using such a peak as a synchronous pulse.

When the incident direction and delay time of a portable terminal PT is estimated from a plurality of demodulation signals received by the array antenna 101, consideration must be paid on multi-path signals produced by reflection and diffraction due to buildings and the like especially in an urban environment. Specifically, it is necessary to select a direct wave from among a plurality of incident signals having correlation with each other and to find the incident direction and delay time of the same.

Description will be made on a method for estimating the incident direction and delay time of a plurality of correlated incident signals with reference to Hideo Kikuchi, Nobuyoshi Kijuma and Naoki Inagaki, "Simultaneous Estimation of the Incident Direction and Propagation Delay time of a Multiple Wave Using 2D-Unitary ESPRIT" Technical Report of IEICE, vol. 97–98, July 1997 (hereinafter referred to as article).

"2D-Unitary ESPRIT" is a method which was conceived to perform two-dimensional parameter estimation (direction/angular height, incident direction/delay time and the like) and which has the followings features.

(A) It requires no knowledge of the response (steering vector) of array elements at the antenna aperture.

(B) It does not require peak search based on the steering vector.

The relationship of rotational invariance in "2D-Unitary ESPRIT" is expressed by the following Equations (1) and (2).

$$\tan\left[\frac{\mu_i}{2}\right] K_{\mu 1} d(\mu_i, v_i) = K_{\mu 2} d(\mu_i, v_i) \quad (1)$$

$$\tan\left[\frac{v_i}{2}\right] K_{vI} d(\mu_i, v_i) = K_{v2} d(\mu_i, v_i) \quad (2)$$

The definitions for the parameters used here are as follows. $\mu 1$ and vi are respectively expressed by Equations (3) and (4).

$$\mu_i = 2\pi f_0 \Delta d \sin \theta_i \quad (3)$$

$$v_i = -2\pi \Delta f \tau_i \quad (4)$$

The symbols in the above Equations (3) and (4) are given by:

f0: carrier frequency;
Δd: element interval;
θi: incident direction of an i-th incident wave;
Δf: frequency sweep interval;
τi: delay time of an i-th incident wave.

K$\mu$1 and K$\mu$2 in Equation (1) are expressed by Equation 6.

$$K_{\mu 1} = I_M \otimes K_1 \quad (6)$$

$$K_{\mu 2} = I_M \otimes K_2$$

where $\otimes$ represents a Kronecker operator.

K1 and K2 in the above Equation (6) are expressed by Equation (7).

$$K_1 = \text{Re}[Q_{N-1}^H J_2 Q_N] \quad (7)$$

$$K_2 = \text{Im}[Q_{N-1}^H J_2 Q_N]$$

where Re[·] represents a real part and Im[·] represents an imaginary part.

Kv1 and Kv2 in Equation (2) are expressed by Equation (8).

$$K_{vI} = K_3 \otimes I_N \quad (6)$$

-continued $$K_{v2} = K_4 \otimes I_N$$

K3 and K4 in the above Equation (8) are expressed by Equation (9).

$$K_3 = \text{Re}[Q_{M-1}^H J_2 Q_M] \quad (9)$$
$$K_4 = \text{Im}[Q_{M-1}^H J_2 Q_M]$$

The suffixes M, N, IM, and IN in Equations (6) through (9) are given by:
M: The number of divisions of a frequency domain;
N: The number of array elements;
IM: M-dimensional order unit matrix;
IN: N-dimensional order unit matrix;
J2 in Equations (7) and (9) is expressed by Equation (11).
J2: selection matrix from the second through M(N)-th rows having the following format.

$$J_2 = \begin{bmatrix} 0 & 1 & & 0 \\ 0 & & \ddots & \\ \vdots & & & \ddots \\ \vdots & & & \ddots \\ 0 & 0 & & 1 \end{bmatrix} \quad (11)$$

QM or QN in Equations (7) and (9) represents an unitary matrix. When M(N) is an even number (M(N)=2K), the unitary matrix is given by:

$$Q_{2K} = \frac{1}{\sqrt{2}} \begin{bmatrix} I_K & jI_K \\ II_K & -jII_K \end{bmatrix} \quad (12a)$$

When M(N) is an odd number (M(N)=2K+1), the unitary matrix is given by:

$$Q_{2K+1} = \frac{1}{\sqrt{2}} \begin{bmatrix} I_K & 0 & jI_K \\ o^T & \sqrt{2} & o^T \\ II_K & 0 & -jII_K \end{bmatrix} \quad (12b)$$

where O, IK, T, and IIK in Equations 12a and 12b are as expressed by Equation (13).

$$II_K = \begin{bmatrix} & & & 1 \\ 0 & & \cdot\cdot & \\ & \cdot\cdot & & \\ & & & 0 \\ 1 & & & \end{bmatrix} \quad (13)$$

where 0: 0 vector;
IK: K-dimensional unit matrix;
T: transpose of matrix.
Furthermore, d($\mu i$, vi) in Equations (1) and (2) is expressed by Equation (14).

$$d(\mu_i, v_i) = vec(D(\mu_i, v_i)) \quad (14)$$

D($\mu i$, vi) in Equation (14) is expressed by Equation (15).

$$D(\mu_i, v_i) = d_N(\mu_i) d_M^T(v_i) \quad (15)$$

$d_N(\mu i)$ and dM(vi) in Equation 15 are respectively expressed by Equations (16) and (17).

$$d_N(\mu_i) = Q_N^H a_N(\mu_i) \quad (16)$$
$$d_M(v_i) = Q_M^H a_M(v_i) \quad (17)$$

aN($\mu i$) in Equation (16) and aM(vi) in Equation (17) are respectively expressed by Equations (18) and (19).

$$a_N(\mu_i) = \begin{bmatrix} \exp\{jN_1\mu_i\} \\ \vdots \\ \exp\{jN_N\mu_i\} \end{bmatrix} \quad (18)$$

Equation (18) represents a steering vector of the incident direction.

$$a_M(v_i) = \begin{bmatrix} \exp\{jM_1 v_i\} \\ \vdots \\ \exp\{jM_M v_i\} \end{bmatrix} \quad (19)$$

Equation (19) represents a steering vector of the delay time.

Mm ($1 \leq m \leq M$) in Equation (19) and Nn ($1 \leq n \leq N$) in Equation (18) are respectively expressed by Equations (20) and (21).

$$M_m = m - \frac{M+1}{2} \quad (20)$$

$$N_n = n - \frac{N+1}{2} \quad (21)$$

where vec($\cdot$) in Equation (14) is given by:
vec($\cdot$)=operator for translating an N×M-dimensional matrix into an NM-dimensional vector.

Figure 3:
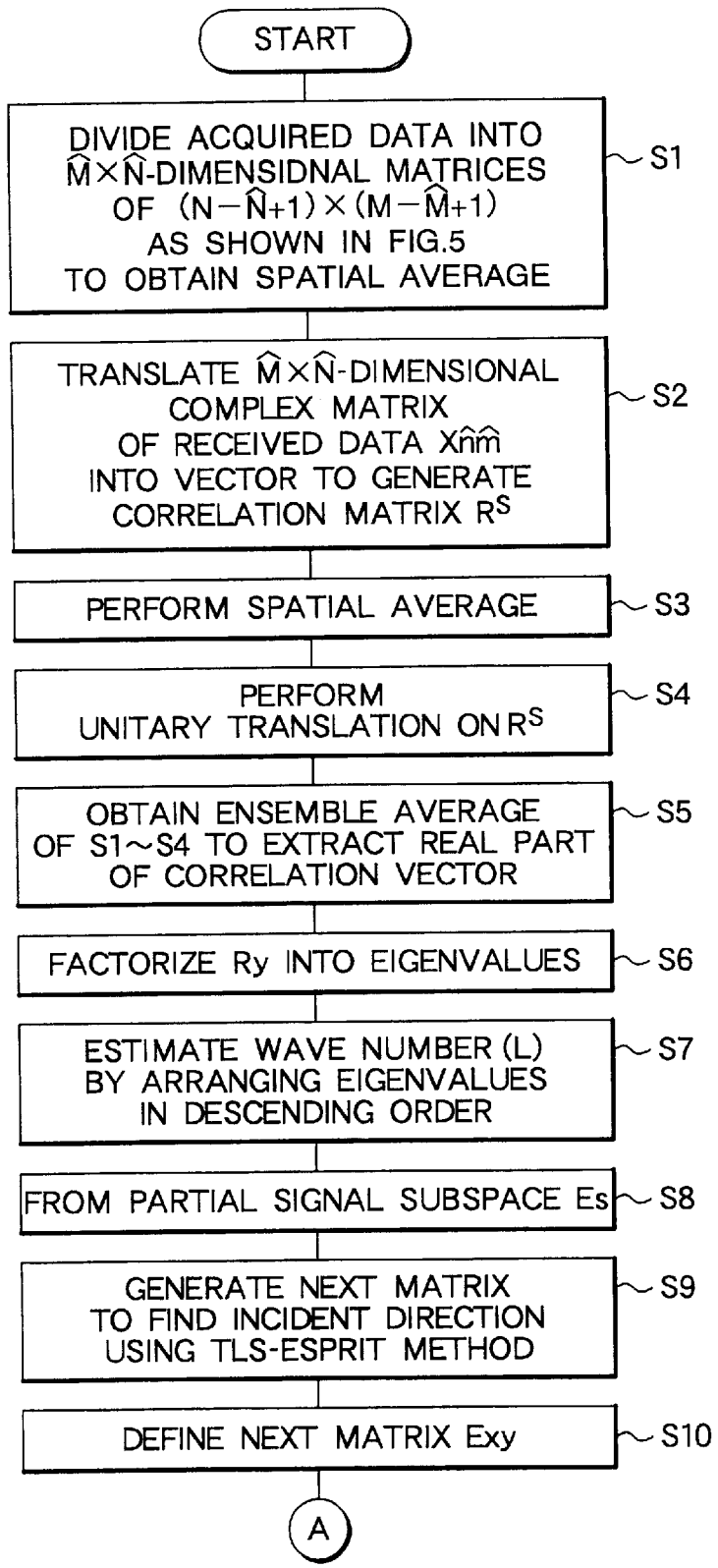
FIG. 3 is a flow chart of a first half of a procedure for estimating incident directions and delay times according to the 2D-Unitary ESPRIT method.
Figure 4:
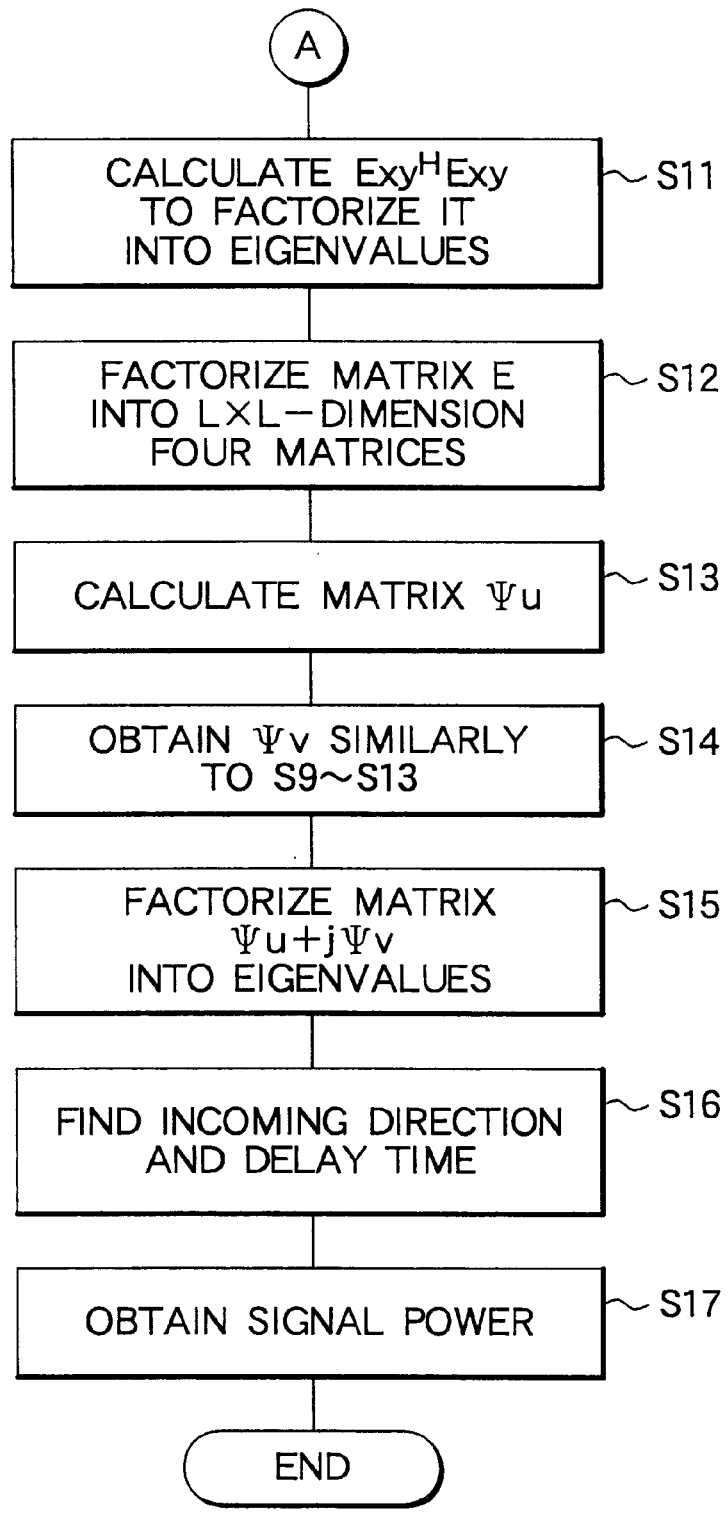
FIG. 4 is a flow chart of a second half of a procedure for estimating incident directions and delay times according to the 2D-Unitary ESPRIT method.

FIGS. 3 and 4 show a procedure for estimating incident direction and delay time according to "2D-Unitary ESPRIT" having the relationship of rotational invariance expressed by Equations (1) and (2).

Figure 5:
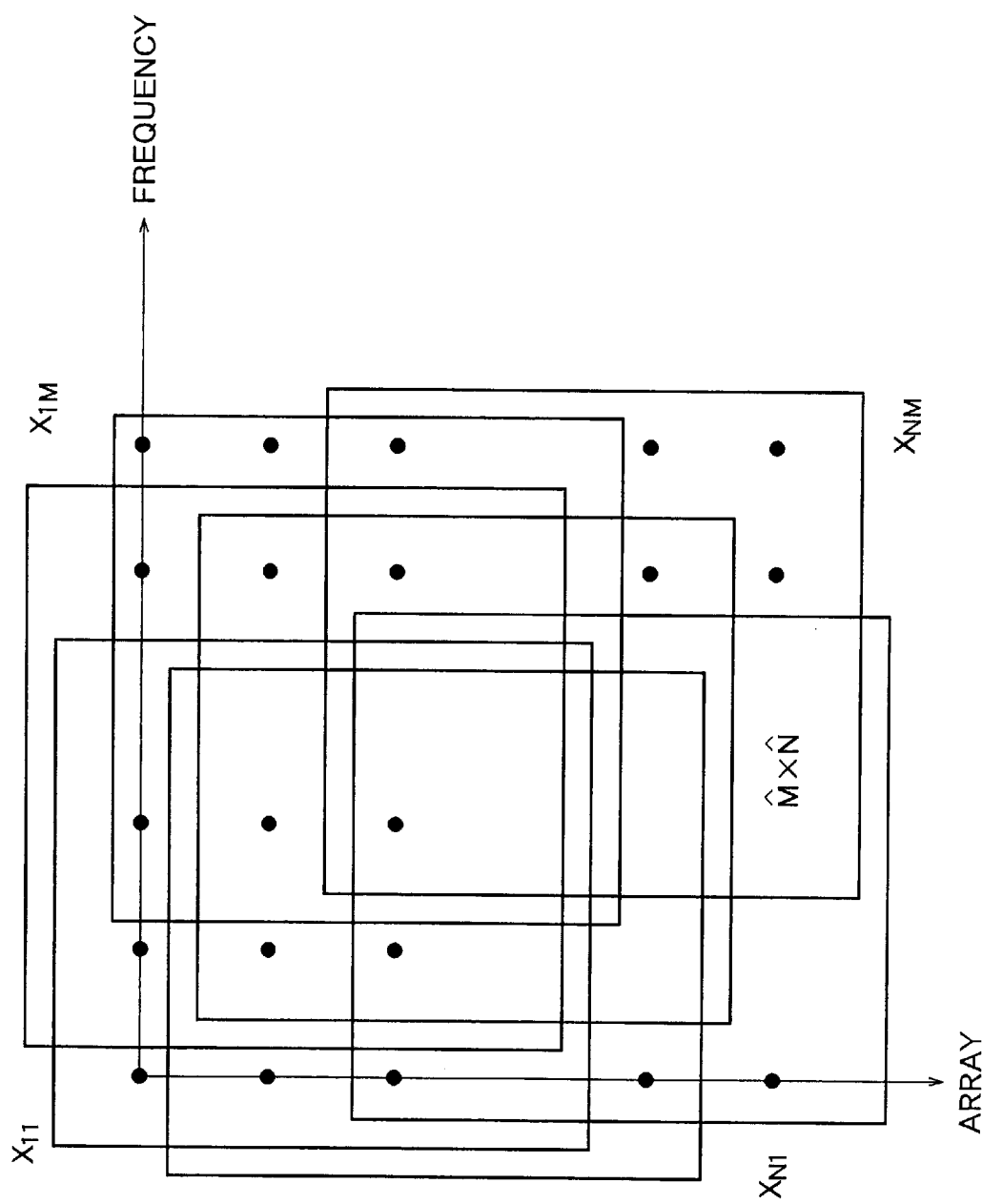
FIG. 5 is an illustration showing a method for spatial averaging according to the 2D-Unitary ESPRIT method.

Acquired data are divided into a matrix as shown in FIG. 5 in order to perform spatial averaging of the same (step S1).

The complex matrix of the received data is translated into a vector as expressed by Equation (23) to generate a correlation matrix $R^S$ as expressed by Equation (24) (step S2).

$$M_{\hat{n}\hat{m}} = vec(X_{\hat{n}\hat{m}}) \quad (23)$$

$$R_{\hat{n}\hat{m}}^S = x_{\hat{n}\hat{m}} x_{\hat{n}\hat{m}}^H \quad (24)$$

This operation is carried out for each subarray. Then, a spatial average process is carried out as expressed by Equation (25) (step S3).

$$R^S = \frac{1}{(N-\hat{N}+1)(M-\hat{M}+1)} \sum_{\hat{n}=1}^{N-\hat{N}+1} \sum_{\hat{m}=1}^{M-\hat{M}+1} R_{\hat{n}\hat{m}}^S \quad (25)$$

The correlation matrix $R^S$ is subjected to unitary translation as expressed by Equation (26) (step S4).

$$Q_{\hat{M}\hat{N}}^H R^S Q_{\hat{M}\hat{N}} \tag{26}$$

$$Q_{\hat{M}\hat{N}}^H - Q_{\hat{M}}^H \otimes Q_{\hat{N}}^H$$

$$Q_{\hat{M}\hat{N}} - Q_{\hat{M}} \otimes Q_{\hat{N}}$$

where $\otimes$ represents a Kronecker operator.

Subsequently, the real part of the correlation matrix is extracted by performing ensemble averaging of steps S1 through S4 as expressed by Equation (27) (step S5).

$$Ry = \text{Re}[E[Q_{\hat{M}\hat{N}}^H R^S Q_{\hat{M}\hat{N}}]] \tag{27}$$

Ry is factorized into eigenvalues (step S6) in order to obtain results defined by:

$\lambda i$: eigenvalue (i=1, ... $\hat{N}\hat{M}$)

ei: eigen-vector corresponding to $\lambda i$

The eigenvalues are arranged in a descending order to estimate a wave number (L) as expressed by Equation (29) (step S7).

$$\lambda_1 \geq \lambda_2 \geq \ldots \geq \lambda_L > \lambda_{L+1} = \ldots = \lambda_{\hat{M}\hat{N}} = \sigma^2 \tag{29}$$

A signal subspace $E_S$ as expressed by Equation (30) is formed (step S8).

$$E_s = [e_1 \ e_2, \ldots, e_L] \tag{30}$$

A next matrix $E\mu$ as expressed by Equation (31) is generated to find the incident direction in accordance with the TLS-ESPRIT method (step S9).

$$E_\mu = \begin{bmatrix} K_{\mu 1} & E_S \\ K_{\mu 2} & E_S \end{bmatrix} \tag{31}$$

First, a next matrix $E_{XY}$ as expressed by Equation (32) is defined (step 310).

$$E_{XY} = [K_{\mu 1} E_S \mid K_{\mu 2} E_S] \tag{32}$$

Next, $E_{XY}^H E_{XY}$ expressed by Equation (33) is calculated to factorize it into eigenvalues (step S11).

$$E_{XY}^H E_{XY} = \begin{bmatrix} (K_{\mu 1} E_S)^H \\ (K_{\mu 2} E_S)^H \end{bmatrix} [K_{\mu 1} E_S \mid K_{\mu 2} E_S] = E \Lambda E \tag{33}$$

where $\Lambda = \text{diag}[\lambda 1, \lambda 2, \ldots \lambda 2L]$, $\lambda i$ represents eigenvalues ($\lambda 1 \geq, \ldots \geq \lambda 2L$), E=(e1 |e2 | ... |$e_{2L}$), and ei represents eigen-vector corresponding to i The matrix E is factorized into four L×L-dimensional matrices as expressed by Equation (34) (step S12).

$$E = \begin{bmatrix} E_{11} & E_{12} \\ E_{21} & E_{22} \end{bmatrix} \tag{34}$$

Then, a matrix $\Psi\mu$ as expressed by Equation (35) is calculated (step S13).

$$\Psi_\mu = -E_{12}[E_{22}]^{-1} \tag{35}$$

A matrix $\Psi v$ is calculated in a manner similar to steps S9 to S13 (step S14). A matrix E is expressed by Equation (36).

$$E_v = \begin{bmatrix} K_{v1} & E_S \\ K_{v2} & E_S \end{bmatrix} \tag{36}$$

Subsequently, a matrix $(\Psi\mu + j\Psi v)$ is factorized into eigenvalues as expressed by Equation (37) (step S15).

$$\{\Psi_\mu + j\Psi_v\} = T^{-1}\{\Omega_\mu + j\Omega_v\}T \tag{37}$$

where a term $w\mu(i) + jwv(i)$ diagonal to $(\Psi\mu + \Psi v j)$ becomes the eigenvalue (i=1, ..., L). Furthermore, L column vectors of $T^{-1}$ are eigen-vectors.

At step S16, the incident direction is given by:

$$\mu_i = 2\pi f_0 \Delta d \sin\theta_i = 2 \tan^{-1} w_\mu(i) \tag{38}$$

$$\theta_i = \sin^{-1}\left\{\frac{\tan^{-1} w_\mu(i)}{\pi f_0 \Delta d}\right\}$$

At the step S16, the delay time is given by:

$$v_i = -2\pi \Delta f \tau_i = 2 \tan^{-1} wv(i) \tag{39}$$

$$\tau_i = \frac{\tan^{-1} wv(i)}{\pi \Delta f}$$

Finally, the signal power is calculated (step S17). The Matrix for the signal power is expressed by Equation (40).

$$\bar{P} = T[\Lambda_S - \sigma^2 I_L]T^H \tag{40}$$

where $\Lambda S$ is given by Equation (41) and $I_L$ is an L×L-dimensional unit matrix.

$$\Lambda_S = \text{diag}[\lambda_1 \lambda_2, \ldots, \lambda_L] \tag{41}$$

where $\Lambda S$ represents eigenvalues for a signal.

A component diagonal to P is the signal power.

Figure 6:
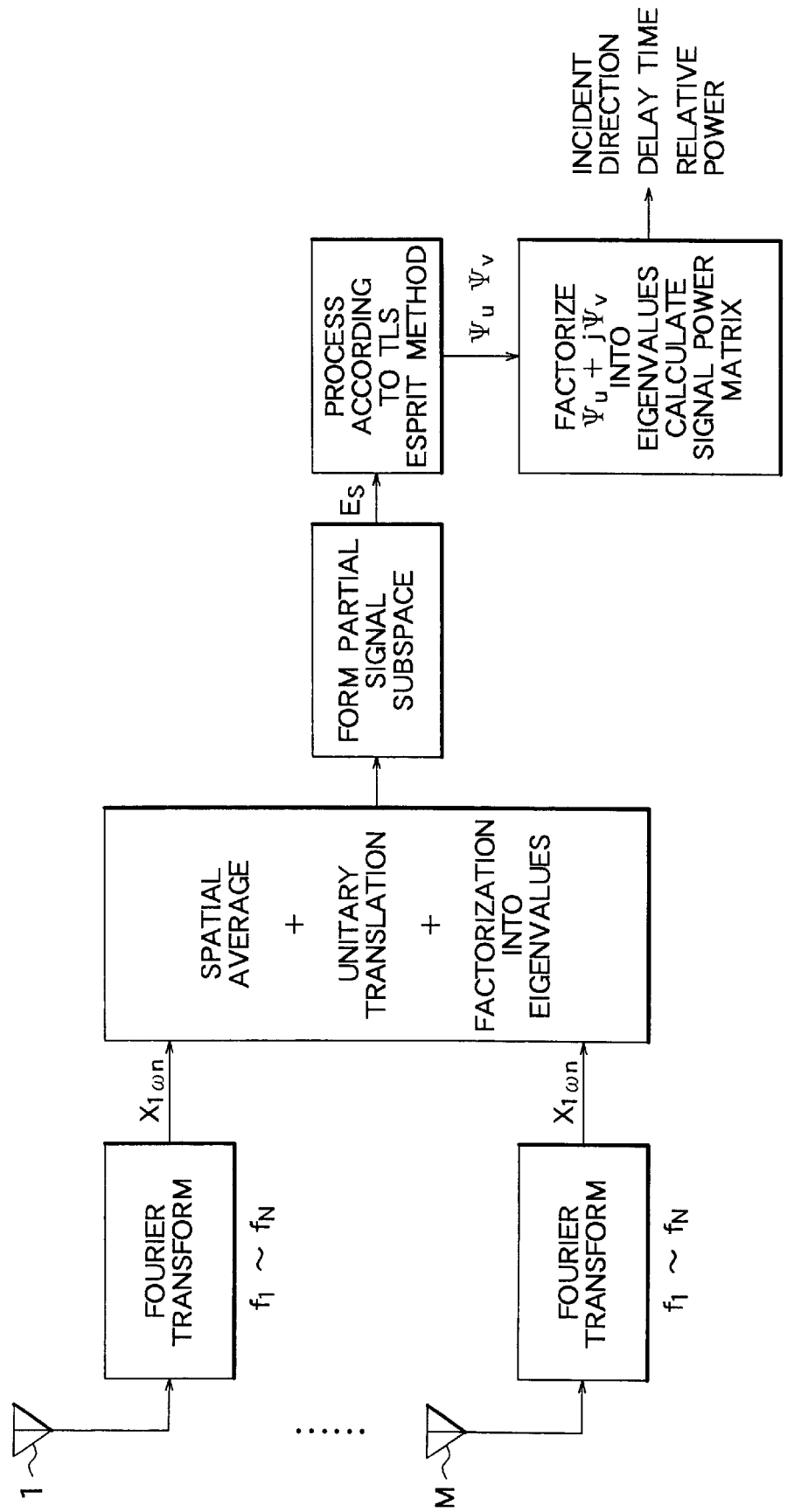
FIG. 6 is a block diagram showing processing steps according to the 2D-Unitary ESPRIT method.

FIG. 6 shows the above-described processing steps according to the "2D-Unitary ESPRIT" method in the form of a simple block diagram. In FIG. 6, each of signals received by M antennas is subjected to Fourier transform and is supplied to a block for spatial average, unitary translation, and factorization into eigenvalues. The block for spatial average, unitary translation, and factorization into eigenvalues is a block that performs the processes at steps S1 to S6 in FIG. 3. The output of the block for spatial average, unitary translation, and factorization into eigenvalues is supplied to a block for forming a partial signal subspace which performs the processes at steps S7 and S9 in FIG. 3. The output of the block for forming a partial signal subspace is supplied to a block for processing according to the TLS ESPRIT method which performs the processes at steps S9 through S14 in FIG. 3. Matrixes $\Psi\mu$ and $\Psi v$ outputted from the block for processing according to the TLS ESPRIT method are supplied to a block for factorizing $\Psi\mu + j\Psi v$ into eigenvalues, signal power, and matrix calculation where. By this block, the processes at steps S15 through S17 in FIG. 3 are performed to output the incident direction, delay time and relative power.

Figure 7:
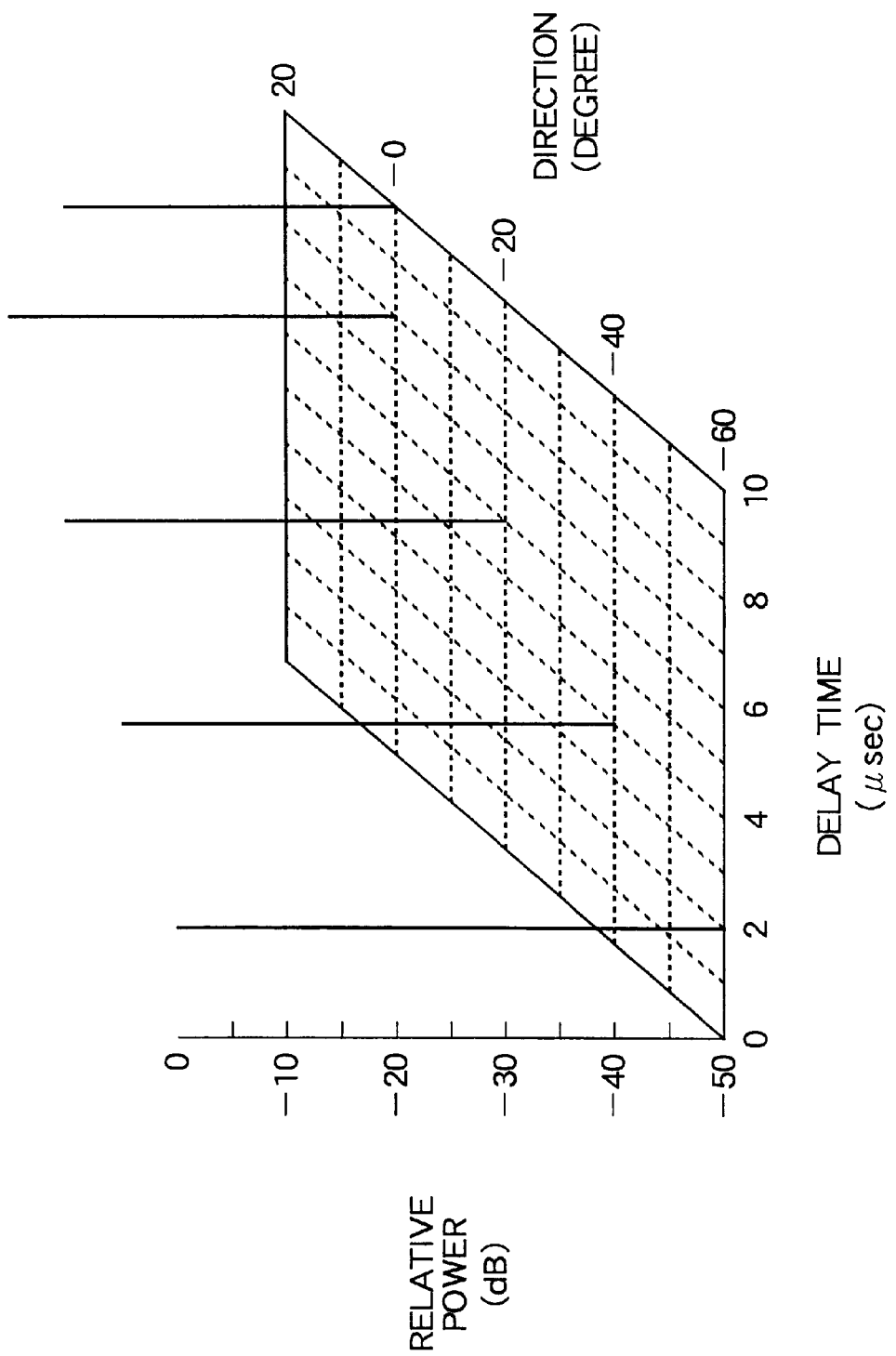
FIG. 7 is a graph showing an example of the result of PDA estimation carried out according to the 2D-Unitary ESPRIT method.

FIG. 7 shows examples of the delay time, incident direction, and relative power of reception signals propagated in a multiplex manner from one portable terminal PT and arriving at the base station SB according to the "2D-Unitary ESPRIT" method. The examples in FIG. 7 are examples of five reception signals propagated in a multiplex manner. The five reception signals are referred here as first through fifth reception signals which have respective increasing delay times.

The first reception signal is a signal with a delay time of $2\mu$ seconds in an incident direction of −60 degrees. The second reception signal is a signal with a delay time of $4\mu$ seconds in an incident direction of −40 degrees. The third reception signal is a signal with a delay time of $6\mu$ seconds in an incident direction of 20 degrees. The fourth reception signal is a signal with a delay time of $8\mu$ seconds in an incident direction of 0 degree. The fifth reception signal is a signal with a delay time of $10\mu$ seconds in an incident direction of 0 degree.

In the example shown in FIG. 7, the positioning circuit 105 determines the first reception signal in an incident direction of −60 degrees which arrives first as a direct wave and judges that the distance between the portable terminal PT and the cellular base section SB is 600 meters from the delay time of $2\mu$ seconds. The result of estimation of the incident direction and delay time is sent to an application system and also transmitted to the portable terminal PT as needed.

Figure 8:
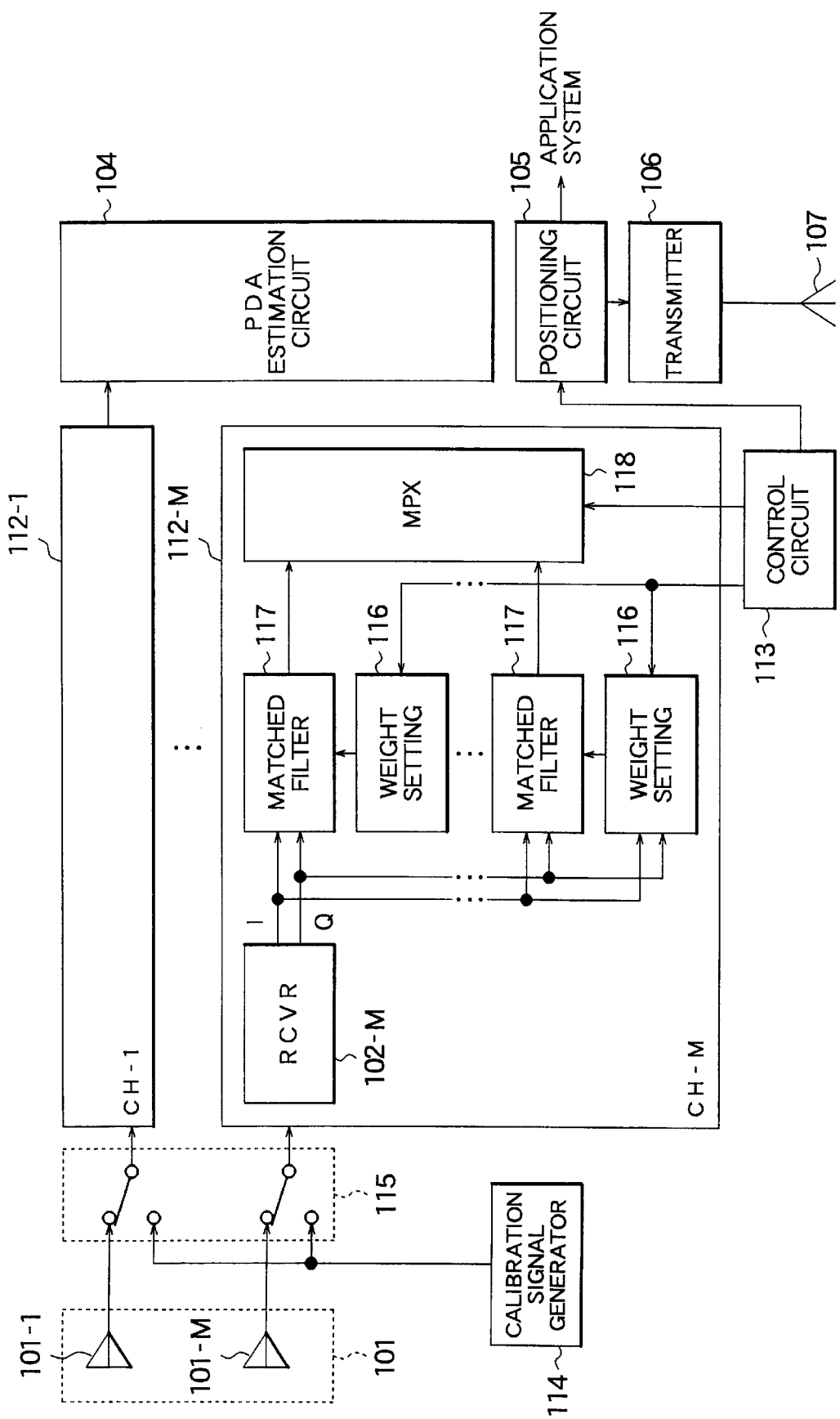
FIG. 8 is a block diagram showing a configuration of a positioner illustrated in FIG. 1.

Referring to FIG. 8, description will be made as regards an example of the positioner. In FIG. 8, Parts having the same functions as those in FIG. 1 are indicated by like reference numbers. The illustrated positioner comprises an array antenna 101, a PDA estimation circuit 104, a positioning circuit 105, a transmitter 106, a transmission antenna 107, first through M-th receiving devices 112-1 to 112-M, a control circuit 113, a calibration signal generator 114 and a calibration signal switch 115.

The array antenna 101 is formed by first through M-th antenna elements 101-1 to 101-M. The array antenna 101 receives signals transmitted by a plurality of portable terminals and outputs them to the first through M-th receiving devices 112-1 to 112-M through the calibration signal switch 115. Since the first through M-th receiving devices 112-1 to 112-M have the same configuration, only the M-th receiving device 112-M is illustrated here. The M-th receiving device 112-M comprises a receiver (RCVR) 102-M, a plurality of weight setting circuits 116, a plurality of matched filters 117 and a multiplexer circuit (MPX) 118.

The receiver 102-M translates a signal received by the M-th antenna element 101-M into a base band signal and phase detects to output an IQ-separated signal to the matched filters 117. The matched filters 117 and the weight setting circuit 116 are prepared in quantities corresponding to the expected maximum number of portable terminals. Weights associated with a demodulation code for each portable terminal are set by the control circuit 113 in the weight setting circuits 116, and the IQ-separated signal is demodulated by the matched filters 117. Demodulated outputs corresponding to the number of portable terminals are multiplexed in time domain at the multiplexer circuit 118 and transmitted to the PDA estimation circuit 104. That is, the combination of the plurality of weight setting circuits 116, the plurality of matched filters 117 and the multiplexer circuit 118 corresponds to one CDMA demodulator shown in FIG. 1.

The control circuit 113 sends the information of weights to the weight setting circuit 116 depending on the number of access from the portable terminals and controls the multiplexer circuit 118 to cause it to output demodulated signals in respective systems simultaneously at preset timing.

The FDA estimation circuit 104 uses the above-described "2D-Unitary ESPRIT" method to estimate the delay time and incident direction of each portable terminal and transmits the result of estimation to the positioning circuit 105. The positioning circuit 105 finds the positions of the portable terminals relative to the base station on the basis of the information indicative of the delay time and incident direction of each portable terminal. The positioning circuit 105 supplies the application system and the transmitter 106 relative position information indicating such relative positions along with the information of the absolute position of the base station. The transmitter 106 multiplexes the information on the position of each portable terminal according to the CDMA method and transmits it to each portable terminal through an aerial by transmitting antenna 107.

The calibration signal generator 114 generates a calibration signal for calibrating the channel gain between the receiving systems and errors in the transmission phase throughout the frequency band. When calibration is carried out, the setting of the calibration signal switch 115 is changed in order to supply the calibration signal to the first through M-th receiving devices 112-1 to 112-M.

The embodiment having such a configuration makes it possible to position a plurality of portable terminals (mobile terminals) in a cell with a device in only one base station covering the cell. The result of positioning may be displayed on the mobile terminals to provide services that replace the existing GPS. The result of positioning may be transmitted to service systems at relevant organizations to allow various services, e.g., guidance of emergency vehicles.

Above-cited article A show that the accuracy of incident direction estimation is 0.5 degrees and the accuracy of delay time estimation is 0.1 nanosecond when there are two incident waves in directions different from each other by 25 degrees with a difference of 5 nanoseconds in delay time. For current cells for portable telephones which have a radius of about 1 Km, the accuracy of positioning is dominated by direction and is about 9 meters which is a preferable value compared to the accuracy of the positioning 20 to 200 meters of GPS.

As readily understood from the above-mentioned description, the direct wave and the multipath wave are separately identified so that the portable terminal is positioned on the base of the incident direction and delay time of the direct wave. Therefore, it is possible to prevent the position service of the portable terminal from limitation in an urban area.

Since the cellular base station estimates not only incident directions but also delay times, it is possible to use a cell configuration for portable telephones.

Furthermore, it is possible to provide the positioning service with a high accuracy inasmuch as no intentional manipulation is made to reduce accuracy in favor of the national interest of one country unlike the case of GPS.

While this invention has thus far been described in conjunction with the preferred embodiment thereof, it will readily be possible for those skilled in the art to put this invention into practice in various other manners.

What is claimed is:

1. A positioning apparatus provided in a cellular base station for determining a position of a portable terminal in a cell covered by said cellular base station, said positioning apparatus having a base position indicative of a position of said cellular base station on a map, the positioning apparatus comprising:

an array antenna for receiving a transmission signal transmitted by said portable terminal to output a plurality of reception signals;

receiver means for translating said reception signals into a plurality of baseband signals to demodulate said baseband signals into a plurality of demodulated signals;

estimation means for estimating incident direction and delay time of said transmission signal on the basis of said demodulated signals to output an estimation result indicative of said incident direction and said delay time; and position calculating means for calculating a terminal position of said portable terminal on said map in accordance with said estimation result and said base position to output a terminal position signal indicative of said terminal position.

2. A positioning apparatus as claimed in claim 1, wherein:

said portable terminal comprises transmitting means for transmitting a multiplexed spread spectrum signal as said transmission signal; and said receiver means comprising a plurality of receivers each of which has a plurality of matched filters for separately demodulating said multiplexed spread spectrum signals.

3. A positioning apparatus as claimed in claim 1, wherein said estimation means comprises:

first means for translating said demodulated signals to digital signals;

second means for estimating the incident direction and the delay time of said transmission signal in accordance with 2D Unitary ESPRIT fashion, said second means further estimating a relative power of said transmission signal in accordance with 2D Unitary ESPRIT; and third means for outputting said estimation result having said relative power together with said incident direction and said delay time.

4. A positioning apparatus as claimed in claim 1, wherein said position calculating means comprises:

first means for determining an incident signal having a shortest delay time as a direct wave on the basis of said estimation result; and second means for calculating said portable position on the basis of said direct wave and the said base position.

5. A positioning apparatus as claimed in claim 1, further comprising:

transmitter means for transmitting said portable position signal as a position transmission signal; and an antenna for emitting the said position transmission signal into a subspace.

6. A positioning apparatus as claimed in claim 5, wherein said transmitter means produces a multiplexed signal having said position transmission signal.

7. A cellular base station communicating with a portable terminal located in a cell, wherein said cellular base station comprises:

positioning means for determining a position of said portable terminal in the cell covered said cellular base station; and transmission means for transmitting said determined position as a position signal to said portable terminal.

8. A cellular base station communicating with a portable terminal located in a cell, said portable terminal transmitting a spread spectrum signal on communicating with said cellular base station, said cellular base station comprising a positioning apparatus for determining a position of said portable terminal, wherein said positioning apparatus comprises:

receiver means for receiving said spread spectrum signal as a reception signal;

estimating means for estimating an incident direction and a delay time of said reception signal on the basis of said reception signal to output an estimation result indicative of said incident direction and said delay time; and calculating means for calculating the position of said portable terminal in accordance with said estimation result.

* * * * *